April 30, 1940.  F. J. CHAPPELLE  2,199,097
LOADING AND UNLOADING DEVICE
Filed Sept. 11, 1939   2 Sheets-Sheet 1
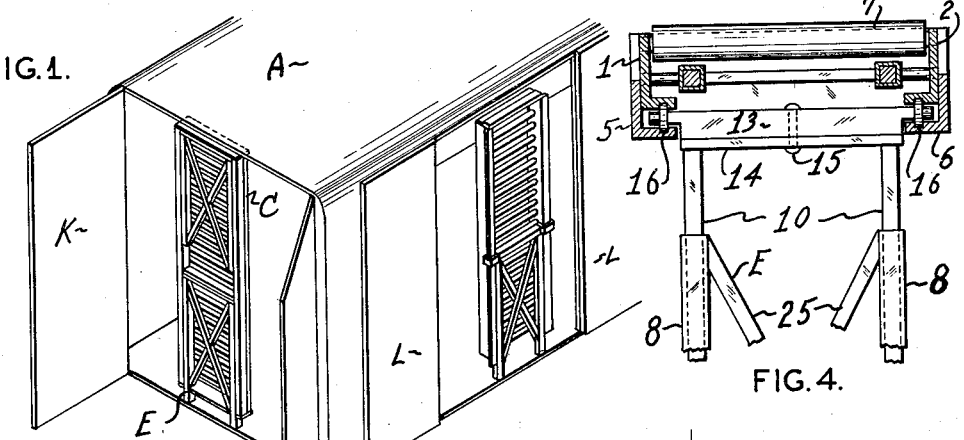
FIG. 1.
FIG. 4.
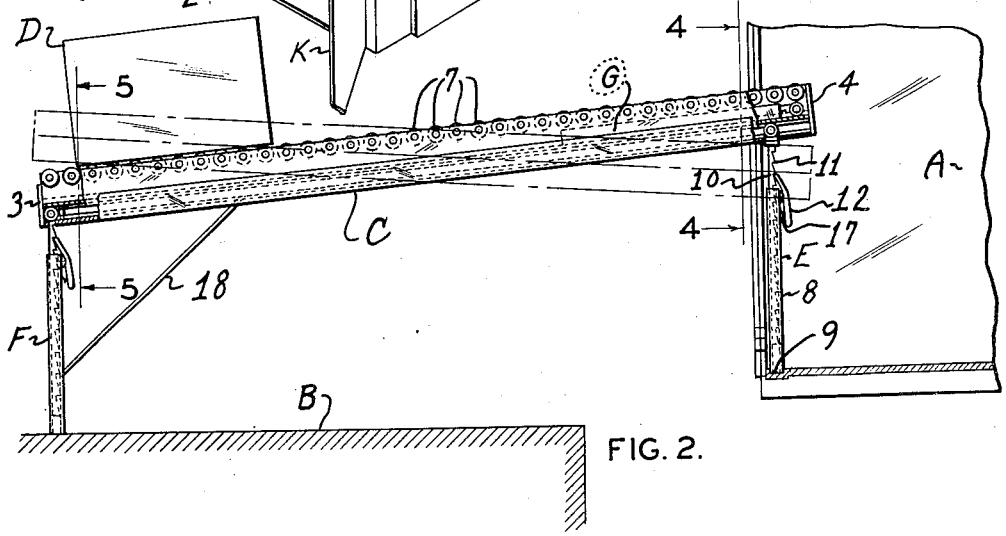
FIG. 2.
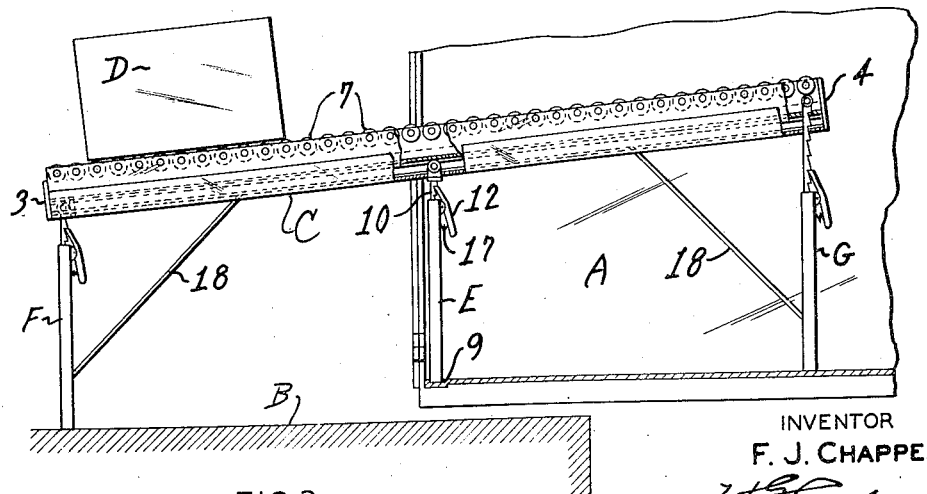
FIG. 3.
INVENTOR
F. J. CHAPPELLE
BY *J. G. Cook*
ATTORNEY April 30, 1940. F. J. CHAPPELLE 2,199,097
LOADING AND UNLOADING DEVICE
Filed Sept. 11, 1939   2 Sheets-Sheet 2
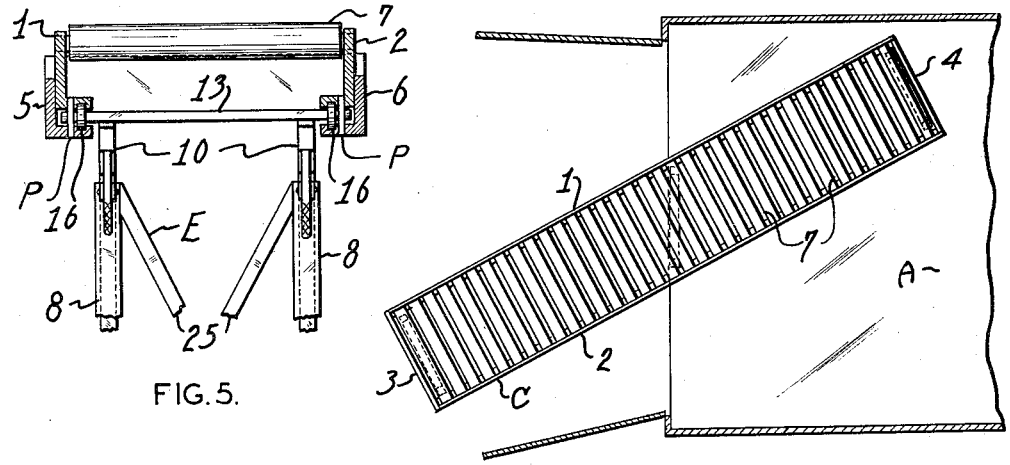
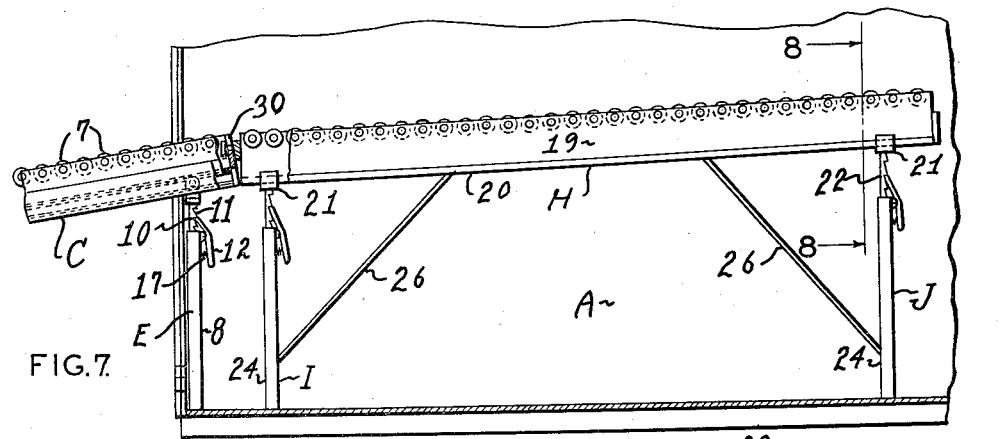
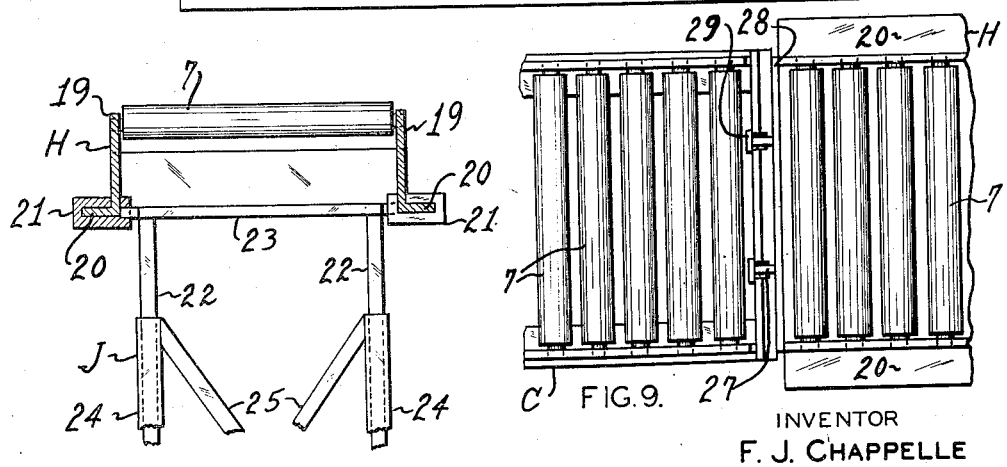
INVENTOR
F. J. CHAPPELLE
BY
ATTORNEY Patented Apr. 30, 1940

2,199,097

UNITED STATES PATENT OFFICE 2,199,097

LOADING AND UNLOADING DEVICE

Fredric J. Chappelle, St. Louis, Mo.

Application September 11, 1939, Serial No. 294,326

6 Claims. (Cl. 193—35)

My invention relates to loading and unloading devices, and has for its primary object to produce a structure of this kind that can be readily carried by the vehicle into or out of which material is to be transferred.

One advantage of my device is that during the loading or unloading operation it is supported by the vehicle with which it is engaged. Another advantage is that I secure the objects of my invention with a minimum number of parts, so that it is not unwieldy, and can be easily manipulated by an operator. This is highly desirable, as truck operators and assistants are expensive and any saving in their time, or any reduction in the number of men necessary to perform the loading or unloading operation, results in a corresponding saving in labor cost, thus reducing the expense of such operations.

Fig. 1 is a rear perspective view of an enclosed type of truck, showing the conveyors positioned, or stored, therein.

Fig. 2 is a side elevation showing a conveyor in use, the truck and loading platform being in section.

Fig. 3 is a view similar to Fig. 2, except that the conveyor has been moved further into the truck, the auxiliary legs being unfolded.

Fig. 4 is a section taken on line 4—4, Fig. 2.

Fig. 5 is a section taken on line 5—5, Fig. 2.

Fig. 6 is a top view of the conveyor, with the truck in section, showing said conveyor swung about in a horizontal plane, the medially positioned supporting legs being unmoved.

Fig. 7 is a section taken through a portion of a truck showing, in side elevation, part of the primary conveyor and an additional conveyor section secured thereto.

Fig. 8 is a section taken on line 8—8, Fig. 7.

Fig. 9 is an enlarged partial top view, showing the means for connecting the two conveyor sections together.

In the drawings a truck A of closed body type is illustrated, but it is to be understood that a stake body, open type truck may be employed, as my invention is equally applicable to either type. B designates a loading platform upon which the outer end of my primary conveyor is adapted to be supported, but it is to be understood that the floor of a railway car or the floor of another truck could be substituted for the loading platform.

The primary conveyor C consists of two parallel, angle-shaped rails 1 and 2, suitably connected together at their ends by the members 3 and 4. Angle-shaped members 5 and 6, fastened to and contacting the outer side faces of the rails 1 and 2, provide a support for rollers (hereinafter to be described), the horizontal portions of rails 1 and 2 being spaced a sufficient distance from the horizontal portions of the members 5 and 6 to accommodate said rollers, and being longitudinally grooved for the reception and movement of said rollers (Fig. 4). Transverse rollers 7 are mounted between the rails 1 and 2 and extend a short distance above said rails, so that a box D, or any other load, may be conveyed by said rollers 7 along said primary conveyor C. It will be understood, of course, that any kind of load may be transferred by my device, but for the purpose of simplifying this application I will refer to the material to be transferred as boxes D. The primary conveyor C may be of any desired length so as to serve as a trackway for the material being handled, although I have found from experience that the most convenient length is from four to four and one-half feet.

Mounted in the primary conveyor C is a supporting structure E, comprising legs 8, one end of each leg being adapted to fit into openings, such as stake openings on a stake truck (not shown), or recesses 9 formed in the floor of an enclosed body truck A. These legs 8 are tubular to receive slidable posts 10 which have ratchet teeth 11 on one edge thereof to accommodate a ratchet 12 mounted on the legs 8. The posts 10 are secured through a transverse bar 14 to a bar 13, as shown in Fig. 4, by a rivet 15 passing through the bars 13 and 14. At the outer ends of the bar 13 are placed rollers 16 which move longitudinally in the grooves in the space between the horizontal portions of the rails 1 and 2 and the horizontal portions of the members 5 and 6 (see Fig. 4). By this arrangement the conveyor C may be moved longitudinally into any desired position for loading and unloading material into or out of the truck A. By means of the teeth 11 and ratchet 12, the height of the primary conveyor C may be as desired. The ratchet 12 is held in engagement with the teeth 11 by an expansion spring 17. The conveyor C may be turned to a vertical position, as shown in Fig. 1, when the conveyor is not in operative position. The primary conveyor C is swingably mounted upon the supporting structure E, so that it may be swung horizontally to direct the ends of said conveyor to different points, as shown in Fig. 6.

I preferably support the outer end of the primary conveyor C by the auxiliary structure F, which is constructed similarly to the supporting structure E. I also provide the auxiliary support